United States Patent
Wei

(10) Patent No.: US 12,492,934 B2
(45) Date of Patent: Dec. 9, 2025

(54) DEVICE FOR MEASURING A PARAMETER INDICATIVE OF THE ROTATIONAL SPEED OF A COMPONENT

(71) Applicant: SKF (China) Co Ltd, Shanghai (CN)

(72) Inventor: Jim Wei, Shanghai (CN)

(73) Assignee: SKF (China) Co Ltd, Shanghai (CN)

( * ) Notice: Subject to any disclaimer, the term of this patent is extended or adjusted under 35 U.S.C. 154(b) by 304 days.

(21) Appl. No.: 17/731,401

(22) Filed: Apr. 28, 2022

(65) Prior Publication Data

US 2022/0364908 A1 Nov. 17, 2022

(30) Foreign Application Priority Data

May 12, 2021 (DE) .......................... 102021204884.6

(51) Int. Cl.
  *G01H 1/00* (2006.01)
  *G01H 1/14* (2006.01)
  *G01P 3/14* (2006.01)
(52) U.S. Cl.
  CPC ............... *G01H 1/003* (2013.01); *G01H 1/14* (2013.01); *G01P 3/14* (2013.01)
(58) Field of Classification Search
  CPC .. G01H 1/003; G01H 1/14; G01P 3/14; G01P 3/48
  See application file for complete search history.

(56) References Cited

U.S. PATENT DOCUMENTS

| | | | | |
|---|---|---|---|---|
| 5,992,237 A * | 11/1999 | McCarty | ................ | G01D 9/005 |
| | | | | 702/56 |
| 6,006,164 A * | 12/1999 | McCarty | ............. | G01M 13/028 |
| | | | | 702/56 |
| 6,202,491 B1 * | 3/2001 | McCarty | .................. | G01H 1/00 |
| | | | | 702/56 |
| 6,298,728 B1 * | 10/2001 | Fekete | ................. | G01P 3/4802 |
| | | | | 73/514.39 |
| 6,513,386 B2 * | 2/2003 | Barclay | ............... | G01M 13/045 |
| | | | | 73/649 |

(Continued)

FOREIGN PATENT DOCUMENTS

| | | | | |
|---|---|---|---|---|
| EP | 3179219 A1 * | 6/2017 | ............ | G01H 1/003 |
| EP | 3370046 A1 * | 9/2018 | ............ | G01H 1/003 |
| WO | WO-2012176011 A1 * | 12/2012 | ............ | F16C 41/007 |

OTHER PUBLICATIONS

Bonnardot et al., Use of the acceleration signal of a gearbox in order to perform angular resampling (with limited speed fluctuation), Elsevier., Mechanical Systems and Signal Processing 19 (2005) 766-785 (Year: 2005).*

(Continued)

*Primary Examiner* — David L Singer
(74) *Attorney, Agent, or Firm* — J-TEK LAW PLLC; Scott T. Wakeman; Mark A. Ussai

(57) ABSTRACT

A device for measuring a parameter indicative of a rotational speed of a component includes a wired or wireless input configured to receive a vibration signal from a vibration sensor, a boost filter configured to filter the vibration signal, based on a predetermined frequency range, into a sinusoidal signal and, a comparator configured to generate a pulse waveform signal from the sinusoidal signal in order to read the value of the parameter. Also a motor or pump controller including the device.

16 Claims, 2 Drawing Sheets

(56) References Cited

U.S. PATENT DOCUMENTS

| | | | |
|---|---|---|---|
| 2004/0158416 A1* | 8/2004 | Slates | G01H 1/00 |
| | | | 702/57 |
| 2012/0072130 A1* | 3/2012 | Doleschel | G01P 3/48 |
| | | | 702/41 |
| 2014/0152426 A1* | 6/2014 | Murphy | F16C 19/52 |
| | | | 340/10.51 |
| 2014/0152451 A1* | 6/2014 | Murphy | F16C 19/525 |
| | | | 340/682 |
| 2015/0015405 A1* | 1/2015 | Bark | F16C 41/008 |
| | | | 340/682 |
| 2015/0048952 A1* | 2/2015 | Murphy | G08B 21/182 |
| | | | 340/682 |
| 2015/0211581 A1* | 7/2015 | Murphy | F16C 41/008 |
| | | | 340/682 |
| 2015/0361959 A1* | 12/2015 | Du Plessis | G05B 23/0283 |
| | | | 700/275 |
| 2017/0205439 A1* | 7/2017 | Liu | G01P 3/48 |
| 2017/0212008 A1* | 7/2017 | Higashiyama | F16C 33/6659 |
| 2019/0195733 A1* | 6/2019 | Stansloski | G01M 1/22 |
| 2019/0293483 A1* | 9/2019 | Duke | G06F 17/17 |
| 2019/0310281 A1* | 10/2019 | Hayzen | G01H 1/003 |
| 2019/0329610 A1* | 10/2019 | Hubert | G01M 13/045 |
| 2020/0073661 A1* | 3/2020 | Innes | G06F 17/16 |
| 2020/0158562 A1* | 5/2020 | Hatakeyama | G01H 1/003 |
| 2021/0199492 A1* | 7/2021 | Hayzen | G01P 3/44 |

OTHER PUBLICATIONS

Combet et al., A new method for the estimation of the instantaneous speed relative fluctuation in a vibration signal based on the short time scale transform, Elsevier, Mechanical Systems and Signal Processing 23 (2009) 1382-1397 (Year: 2009).*

Lin et al., A new method for measuring engine rotational speed based on the vibration and discrete spectrum correction technique, Elsevier, Measurement 46 (2013) 2056-2064 (Year: 2013).*

Urbanek et al., A two-step procedure for estimation of instantaneous rotational speed with large fluctuations, Elsevier, Mechanical Systems and Signal Processing 38 (2013) 96-102 (Year: 2013).*

Chirindo et al., Analysis of Non-Intrusive Rotor Speed Estimation Techniques for Inverter-Fed Induction Motors, IEEE Transactions On Energy Conversion, vol. 36, No. 1, Mar. 2021 (Year: 2021).*

Buscarello, Practical Solutions to Machinery and Maintenance Vibration Problems Chapter 1, 2002, Update International, Fourth Revised Edition (Year: 2002).*

Girdhar et al., Practical Machinery Vibration Analysis and Predictive Maintenance, 2004, Science Direct (Year: 2004).*

General Electric, Beginner's Guide Machine Vibration, 2013 (Year: 2013).*

Transcat and Fluke, Training Series Vibration Testing Webinar, 2017 (Year: 2017).*

* cited by examiner

Vibration amplitude vs. Time of a Rotating Component

Vibrational amplitude vs. Time of a Rotating Component - Sinusoidal

Vibrational amplitude vs. Time of a Rotating Component - Pulsed

DEVICE FOR MEASURING A PARAMETER INDICATIVE OF THE ROTATIONAL SPEED OF A COMPONENT

CROSS-REFERENCE

This application claims priority to German patent application no. 10 2021 204 884.6 filed on May 12, 2021, the contents of which are fully incorporated herein by reference.

TECHNOLOGICAL FIELD

The present disclosure is directed to signal processing methods and devices suitable for extracting a specific parameter from an acquired signal. More particularly, the disclosure relates to the processing of vibration signals related to rotating components.

BACKGROUND

In order to control the switching on and off or the regulation of a motor power supply, for example if the rotational speed exceeds a predetermined value, it is important to measure a parameter indicative of the rotational speed of a motor shaft and to provide this information to the system.

Furthermore, because the value of the parameter has to verified on a weekly basis in accordance with specific standards or recommendations, it is beneficial to obtain the parameter in a simple and quick way, especially if a large number of components need to be checked.

This verification should also be done during the manufacture of a motor. For instance, when an electric motor is built, the rotation speed of the shaft is controlled according to the consumed current. This test requires the use of a fast and accurate speed measuring device.

There are various solutions to measure the rotation speed of components in industry such as a tachometer. More precisely, a tachometer is an instrument for measuring the speed of a rotating object. The measurement can be made mechanically, optically or via eddy currents.

For example, optical tachometers, that are particularly used for measurements on rotating objects, emit light that will reflect on a target and return to the device provided with a receiver. The speed is thus measured by counting the frequency at which the light beam is reflected. However, this solution is space-consuming and requires a complex installation on or inside the component. Furthermore, when a power transmission system has multiple shafts connected by a gearbox, a tachometer must be installed for each shaft.

Other solutions only estimate the average rotational speed during the whole data acquisition period by examining the spectrum of the vibration signal. But, the average rotational speed cannot be used to provide a good diagnosis of the component, especially if there is a large variation of rotational speed.

SUMMARY

Thus, one aspect of the present disclosure is to measure an accurate value of the parameter in a simplified and fast way as well as to minimize the required amount of space in the component.

For this purpose, a first aspect of the disclosure is a method of measuring a parameter indicative of a rotational speed of a component that includes: acquiring a vibration signal obtained by a vibration sensor mounted on the component, filtering the vibration signal, based on a predetermined frequency range, into a sinusoidal signal, and generating a pulse waveform signal from the sinusoidal signal in order to read (determine) the value of the parameter.

With this method, the parameter is derived from the vibration signal.

When this method is applied to a power transmission chain, it generates signals related to the parameter for all shafts in a gearbox.

Specifically, the vibration signal delivered by a sensor is represented as a function of time. This representation is used to follow the vibratory behavior of the component during its exploitation. However, as the vibration signal is difficult to read, it is therefore preferable to first decompose it into a sinusoidal signal defined by its amplitude. The sinusoidal signal can then be represented in the form of a pulse waveform signal, known as a duty cycle, which helps to read the value of the parameter.

In other words, each vibratory segment is represented by a vertical bar whose abscissa represents time and whose ordinate represents the amplitude. Thus, it possible to transcribe it into a rotation speed for example without using a speed sensor. In other words, the installation of a sensor configured to acquiring this parameter becomes unnecessary.

In one embodiment, the predetermined frequency range is a frequency range of variation of the parameter. In particular, when the value of the parameter under optimal conditions and its range variation is known, it is advantageous to use these information to choose the bandwidth to apply the filtering.

In one embodiment, the component is a drive shaft.

In one embodiment, the parameter is the rotational frequency of the drive shaft.

In an alternative embodiment, the parameter is the speed of the drive shaft.

As a variant, the component is a centrifugal pump.

In one embodiment, the parameter is the blade passage of the centrifugal pump.

According to another aspect, the disclosure comprises a device for measuring a parameter indicative of the rotational speed of a component that includes acquisition means for receiving a vibration signal sent by a vibration sensor mounted on the component, a boost filter configured to filter the vibration signal, based on a predetermined frequency range, into a sinusoidal signal and, a comparator configured to generate a pulse waveform signal from the sinusoidal signal in order to read the value of the parameter.

The boost filter amplifies or cuts the mid-frequency bands according to the setting of at least three filter parameters which are the central frequency, a bandwidth and a gain.

In one embodiment, the predetermined frequency range is a frequency range of variation of the parameter.

Another aspect of the disclosure comprises a motor and a motor controller that includes the device for measuring a parameter indicative of a rotational speed of a component described above. The sensor is connected to the motor, and the motor controller is configured to control a speed of the motor based on an output of the comparator.

A further aspect of the disclosure comprises a pump and a pump controller that includes the device for measuring a parameter indicative of a rotational speed of a component described above. The sensor is connected to the pump, and the pump controller is configured to control a speed of the pump based on an output of the comparator.

The disclosure further comprises an integrated circuit comprising a device for measuring a parameter indicative of the rotational speed of a component as defined above.

BRIEF DESCRIPTION OF THE DRAWINGS

The Present Invention and its Advantages Will be Better Understood by Studying the Detailed Description of a Specific Embodiment Given by Way of a Non-Limiting Example and Illustrated by the Appended Drawings on which.

DETAILED DESCRIPTION

Figure 1:
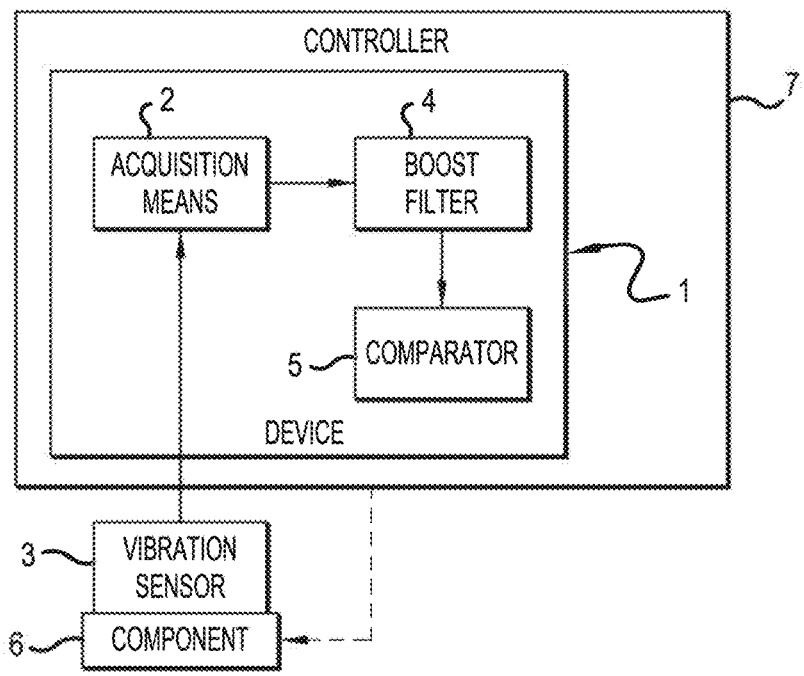
FIG. 1 schematically illustrates a device configured to measure a parameter indicative of the rotational speed of a component according to an embodiment of the disclosure.

FIG. 1 shows a device 1 configured to measure a parameter indicative of a rotational speed of a component 6 such as a centrifugal pump or a drive shaft. For example, if the component 6 is a centrifugal pump, the parameter may be the blade passage frequency of the centrifugal pump. When the component 6 is the drive shaft of an engine, the parameter may be in this case the rotational frequency of the drive shaft or its speed. Such a device 1 can be embedded in an integrated circuit and included in a controller 7 for controlling the component 6.

Figure 2A:
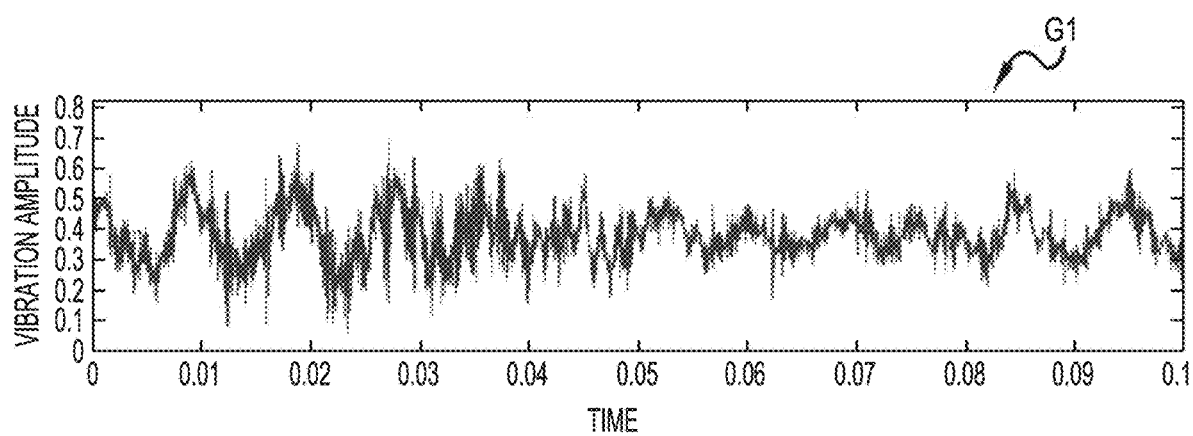
FIG. 2A is a first graph G1 that illustrates a vibration amplitude according to time.

To determine the value of the parameter, the device 1 comprises acquisition means (input connector or a receiver) 2 configured to receive a vibration signal sent by a vibration sensor 3 external to the device and mounted on the component 6. The vibration signal represents the vibration amplitude (G) as a function of time (T) as illustrated in FIG. 2A. Of course, the vibration sensor 3 can be replaced by any other apparatus adapted to trace the vibration signal.

The vibration sensor 3 can be wired to the acquisition means 2, e.g., when the acquisition means is an input connector, or wirelessly coupled to the acquisition means 2, e.g., when the acquisition means is a receiver.

Figure 2B:
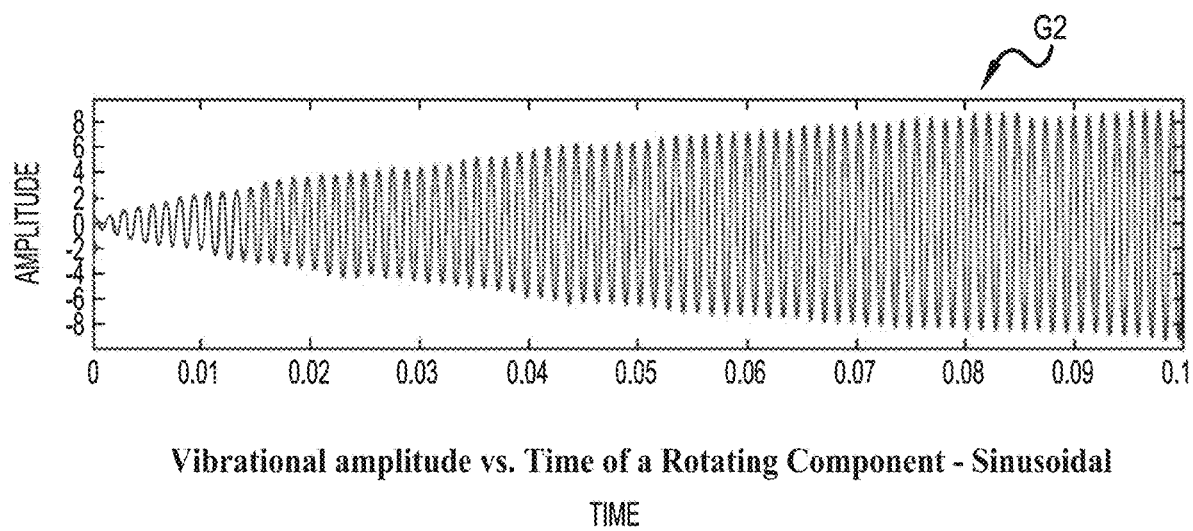
FIG. 2B is a second graph G2 that shows the amplitude in a function of time having a sinusoidal form signal.

However, because the vibration signal may be difficult to read, the device 1 further comprises a boost filter 4 coupled to acquisition means 2 and configured to receive as input the vibration signal and to transform the vibration signal into a sinusoidal signal defined by its amplitude (A) progressing over time (T) as illustrated in FIG. 2B.

For this purpose, the boost filter 4 is built according to at least three filter parameters which are the central frequency, a bandwidth and a gain.

The boost filter 4 is further built based on the variation range of the parameter. Thus, the boost filter 4 is configured to extract a predetermined frequency range comprising a range of variation of the parameter.

For example, it is known that generally the meshing frequency of a gear is 775.21 Hz at a speed of 40 km/hour in optimal conditions. Based on this information, the central frequency may be set to 775 Hz, the bandwidth to 200 Hz to allow the speed variation, and the gain to 100.

Figure 2C:
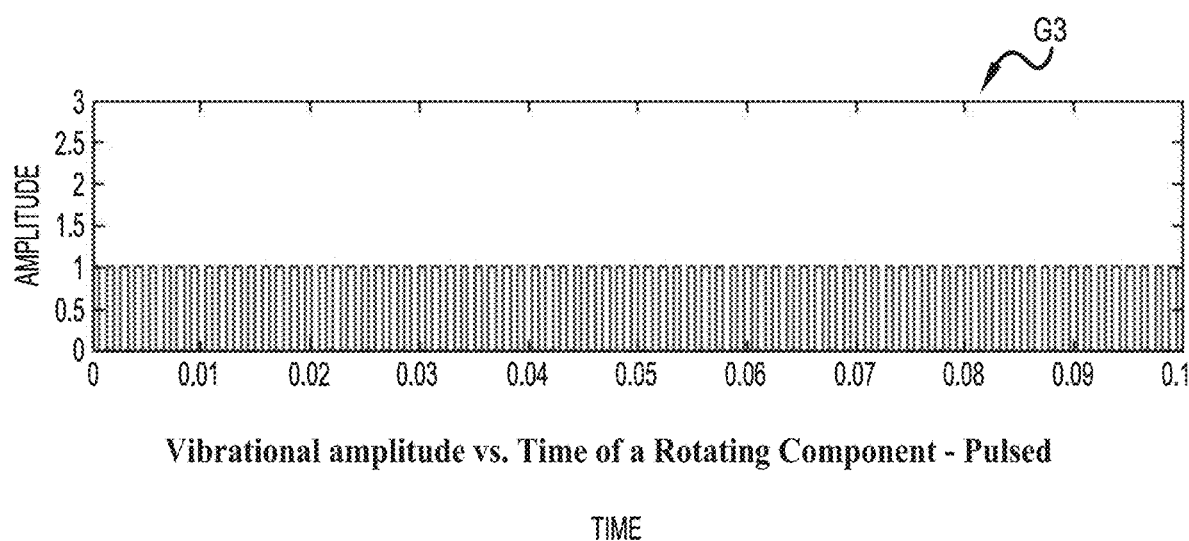
FIG. 2C is a third graph G3 representing a pulse waveform signal.

To read the parameter value on the sinusoidal signal outputted from the boost filter 4, the device 1 also comprises a comparator 5 coupled to the boost filter 4 and configured to generate as an output a pulse waveform signal from the sinusoidal signal. In particular, the pulse waveform signal represents the evolution of the amplitude (A) over time (T) as shown in FIG. 2C. If the evolution of the amplitude over time indicates that the rotational speed of the motor shaft has exceeded a predetermined range, the device 1 can output a signal to switch off or otherwise regulate a motor power supply.

The pulse waveform signal is here used to represent a duty cycle which helps to read the value of the parameter such as the rotation speed of the component without using a speed sensor.

The disclosure is not limited to these embodiments but comprises all the variants. For example, the device 1 can be implemented on the component and wirelessly transfer the parameter. The device can also be located outside the component and thus be configured to remotely receive the vibration signal.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved device for measuring a parameter indicative of a rotational speed of a component.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

What is claimed is:

1. A device for measuring a parameter indicative of a rotational speed of a component, comprising:
   acquisition means configured to receive a vibration signal from a vibration sensor mounted on the component;
   a boost filter configured to filter the vibration signal, based on a predetermined frequency range, into a sinusoidal signal; and
   a comparator configured to generate a pulse waveform signal from the sinusoidal signal in order to read the value of the parameter.

2. The device according to claim 1, wherein the predetermined frequency range includes an expected frequency of the component and a variation frequency range around the expected frequency range.

3. An integrated circuit comprising a device for measuring a parameter indicative of a rotational speed of a component according to claim 2.

4. The device according to claim 1,
wherein the acquisition means comprises an input circuit connected to the boost filter.

5. The device according to claim 1,
wherein the acquisition means comprises a wireless receiver.

6. A device comprising:
a motor and a motor controller;
wherein the motor controller includes the device according to claim 1;
wherein the sensor is connected to the motor; and
wherein the motor controller is configured to control a speed of the motor based on an output of the comparator.

7. The device according to claim 6,
wherein the output of the comparator is indicative of a magnitude of the pulse waveform signal.

8. A device comprising:
a pump and a pump controller;
wherein the pump controller includes the device according to claim 1;
wherein the sensor is connected to the pump; and
wherein the pump controller is configured to control a speed of the pump based on an output of the comparator.

9. The device according to claim 8,
wherein the output of the comparator is indicative of a magnitude of the pulse waveform signal.

10. A method of measuring a parameter indicative of a rotational speed of a component with the device according to claim 1, comprising:
acquiring with the acquisition means a vibration signal from the vibration sensor mounted on the component;
filtering with the boost filter the vibration signal, based on a predetermined frequency range, into a sinusoidal signal; and
generating with the comparator a pulse waveform signal indicative of the parameter from the sinusoidal signal.

11. The method according to claim 10, wherein the predetermined frequency range includes an expected frequency of the component and a variation frequency range around the expected frequency range.

12. The method according to claim 10, wherein the component is a drive shaft.

13. The method according to claim 12, wherein the parameter is a rotational frequency of the drive shaft.

14. The method according to claim 12, wherein the parameter is a speed of the drive shaft.

15. The method according to claim 10, wherein the component is a centrifugal pump.

16. The method according to claim 15, wherein the parameter is a blade passage frequency of the centrifugal pump.

* * * * *